United States Patent [19]
Westberg

[11] Patent Number: 5,388,096
[45] Date of Patent: Feb. 7, 1995

[54] DISTRIBUTED CIRCUIT SWITCH HAVING SWITCH MEMORY AND CONTROL MEMORY

[75] Inventor: Lars Westberg, Enkoping, Sweden

[73] Assignee: Telefonaktiebolaget L M Ericsson, Stockholm, Sweden

[21] Appl. No.: 79,864

[22] Filed: Jun. 23, 1993

[30] Foreign Application Priority Data

Jun. 24, 1992 [SE] Sweden .................................. 9201945

[51] Int. Cl.6 ........................................... H04L 12/52
[52] U.S. Cl. ..................................... 370/58.1; 370/66
[58] Field of Search ............................. 370/58.1-58.3, 370/59, 60.1, 66, 68, 67

[56] References Cited

U.S. PATENT DOCUMENTS

| | | | |
|---|---|---|---|
| 4,201,889 | 5/1980 | Lawrence et al. | 320/68 |
| 4,488,290 | 12/1984 | Dunn et al. | 370/67 |
| 4,545,053 | 10/1985 | Raamot | 370/66 |
| 4,841,522 | 6/1989 | Yamazaki | 370/64 |
| 4,941,141 | 7/1990 | Hayano | 370/66 |
| 5,123,012 | 6/1992 | Suzuki et al. | 370/66 |

FOREIGN PATENT DOCUMENTS 0032864 7/1981 European Pat. Off. .
461002 12/1989 Sweden .
WO90/16121 12/1990 WIPO .
WO91/07857 5/1991 WIPO .

Primary Examiner—Douglas W. Olms
Assistant Examiner—Ajit Patel
Attorney, Agent, or Firm—Burns, Doane, Swecker & Mathis

[57] ABSTRACT

A digital switch intended for use in a node in a circuit switched telecommunication network with a distributed switching function includes a switch memory, and a time slot counter, which is connectable to the switch memory and arranged to point out an address in the switch memory for cyclical writing of incoming data into the switch on this address. A control memory is arranged for controlling the sequence order for read out of data from the switch memory. The switch memory is connectable via an adapting device to a transmission medium, which is common to a number of nodes in the network. The time slot counter is connected via the adapting device to receive frame synchronization from the common transmission medium. The control memory is arranged for selecting time slots from the common transmission medium and generating read address to the switch memory. The control memory and the switch memory are realized with fewer memory cells than admitted by the address space.

7 Claims, 4 Drawing Sheets

DISTRIBUTED CIRCUIT SWITCH HAVING SWITCH MEMORY AND CONTROL MEMORY

BACKGROUND

The present invention relates to a digital switch used in a node of a circuit-switched communication network.

In future the switching function of a telecommunication network will be increasingly distributed, i.e. decentralized. Presumably data communication and telephony will also be mixed. In two new industry standards (DQDB and FDDI-II) datacom and telephony are mixed in a distributed system architecture. As regards telephony this means that also the circuit switch will be distributed.

One of the advantages with a distributed circuit connected switch is that it most often will be relatively small in each node and that the manufacturing costs for the complete switch will be proportional to the number of nodes.

A conventional time switch includes a control memory, a switch memory and a time slot counter. In the switch memory data is cyclically entered into the memory on an address which is pointed to by the time slot counter. At reading out data from the switch memory the value of the time slot counter is translated in the control memory before becoming an address to the switch memory. The data is read out in an order determined by the control memory. A processor writes into the control memory for updating a table of read out order located therein.

A distributed switch of the kind defined above by way of introduction is e.g. known from the Swedish patent application 9103719-2 which corresponds to commonly assigned U.S. patent application Ser. No. 07/990,646. A switch of this type has the disadvantage that it implies a significant increase of costs in the network.

SUMMARY

One object of the invention is to provide a switch of the kind mentioned by way of introduction by means of which additional cost in each node is significantly decreased.

Another object is to protect such a switch against erroneous connection for preventing an unintentional listener from being able to interpret what is said.

According to the invention the above objects have been achieved in a switch of the kind indicated by the switch memory being connectable via an adapting device to a transmission medium, which is common to a number of nodes in the network. Also, the time slot counter is connected via the adapting device for receiving frame synchronization from the common transmission medium, and the control memory is arranged for selecting time slots from the common transmission medium and for generating a read address to the switch memory. Each of the control memory and the switch memory includes memory cells and an address space, and the number of the memory cells is less than admitted by the address space, which is defined as the maximum number of possible address combinations between a lowest and an uppermost address.

Through the invention the control memory and the switch memory can be realized in such a way that the number of memory cells is reduced to only the number required in each node.

DESCRIPTION OF THE FIGURES

The invention will now be described in detail by means of the embodiments shown on the enclosed drawings, in which.

DETAILED DESCRIPTION

Figure 1:
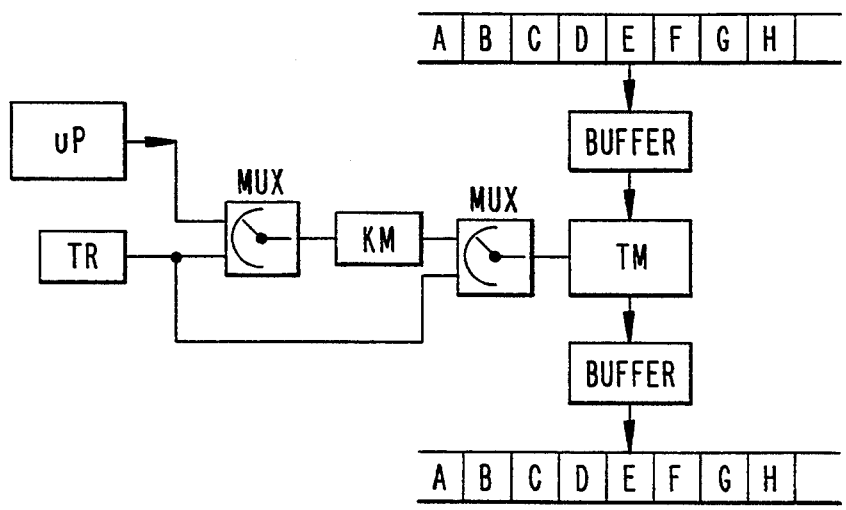
FIG. 1 is a block diagram showing a conventional time switch.

The conventional time switch shown in FIG. 1 comprises a control memory KM, a switch memory TM and a time slot counter TR. Buffers are provided for digital data entering and leaving the switch. In the switch memory data is cyclically entered on an address which is pointed to by the time slot counter. At reading out of data from the switch memory the value of the time slot counter TR is translated in the control memory KM before it becomes an address to the switch memory TM. The data is read out in an order decided by the control memory. Via a multiplexer MUX a processor uP can write into the control memory for updating a table of order of read out located therein.

Figure 2:
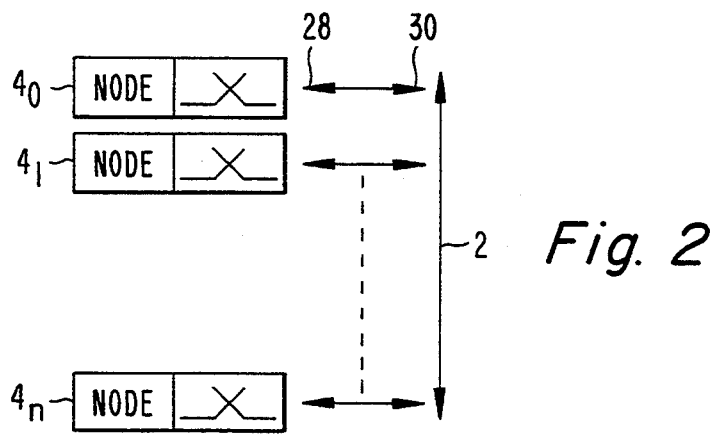
FIG. 2 is a block diagram showing part of a telecommunication network with distributed time switches.

With reference to the very schematically illustrated telecommunication network in FIG. 2, a common data buss 2 interconnects a number of distributed time switches $4_0$–$4_n$ associated with a respective node 0–n included in the network.

With reference to FIG. 3$a$ each time switch $4_0$–$4_n$ comprises a control memory 6, a switch memory 8, a time slot counter 10 and a micro processor 12. The control memory 6 is connectable to the time slot counter 10 and the microprocessor 12 via a multiplexer 14. The switch memory 8 is connectable to the control memory 6 and the time slot counter 10 via a multiplexer 16. An input buffer 18 receives a digital datastream 22 arriving to the switch on a trunk 20. Read out from the switch memory 8 is made via an output buffer 24 on a trunk 26.

In the switch memory 8 data is entered cyclically on an address which is pointed to by the time slot counter 10. At read out of data the value of the time slot counter 10 is translated in the control memory 6 before becoming an address to the switch memory 8. Via the multiplexer 14 the processor 12 is enabled to write in the control memory for updating a table of order of read out located therein.

The switch memory 8 is connected to the databuss 2 common to all nodes according to FIG. 2 (or to any other common medium), said buss being not visible in FIG. 3$a$. The connection can be an optical cable or any other suitable transmission medium and is indicated in FIG. 3$a$ by double arrows 28,30. In a way known per se, data and frame synchronisation is included in the buss, one of the connected nodes having an oscillator for generating frame synchronisation.

The connection to the switch memory 8 is established via a bus adaptor 32 for adapting the interface between the input buffer 18 and the common medium 28,30. If the common medium e.g. is a buss having separated data and frame synchronisation, the adapting adaptor in the simplest case may be control by a buss driver and be realized together with the input buffer 18 and control of the switch memory 8. Via the function 32 the time slot counter 10 obtains frame synchronisation from the data buss 2 on a line 34. A decoding logic 36 is arranged between the time slot counter 10 and the input buffer 18. The task of the decoding logic 36 is to achieve that the incoming time slot stream 22 is transmitted via the input buffer 18 in specific time slots in the common buss.

The decoding logic 36 can be implemented in a conventional way by means of decoders, and it controls the value of the time slot counter so that the input buffer 18 is opened at the occurrence of correct time slot on the common buss and the contents in the input buffer 18 are transferred to the buss. An example of decoding logic for 8 time slots is e.g. a so called 3-to-8 decoder (Texas Instrument 74138).

To sum up, the decentralized switch is based upon using the data buss 2 to control memory 8 in common for all nodes, which must include control memory 6, switch memory 8 and time slot counter 10. Based upon a realization of the fact that a node only needs a few time slots, switch memories and control memories are realized, according to the invention, with a number of memory cells less than admitted by the address space, i.e. the maximum number of possible address combinations between a lowest and an uppermost address. If it is e.g. assumed that there is one time slot per memory cell, the address space would be the same as the total number of time slots on the common buss. As an example associative memories may be mentioned. The write address is stored in the memory and memory information exists only in these positions. The address of the memory cell is stored together with the data in each memory cell. At reading/writing in the memory the incoming address is compared to the contents in an address register included in the memory cell. At the occurrence of agreement the data register of the memory cell is opened for writing and reading.

The gain obtainable with this solution as compared to using conventional memories (one time slot/memory cell and congestion free connection to a trunk) increases with the quotient number of time slots on common buss/time slots on trunk.

The control memory 6 has two tasks, namely to select time slots from the common buss for writing in the switch memory 8 (read/write-signal) and to generate the read address to the switch memory 8. As mentioned above an incoming time slot stream 22 is sent out via the data buffer 18 in specific time slots in the common buss by means of the decoding logic 36. The time slot counter 10 is synchronised to synchronisation information on the buss.

To be able to manage free memory cells the microprocessor 12 can be arranged to reset memory cells in the control memory 6 and the switch memory 8 via the connection 37, as is described below with reference to FIG. 4 and 5, i.e. free mark memory cells. The operation implies that the processor gets an opportunity to initiate the address register in the memory cell with a new address.

Figure 3A:
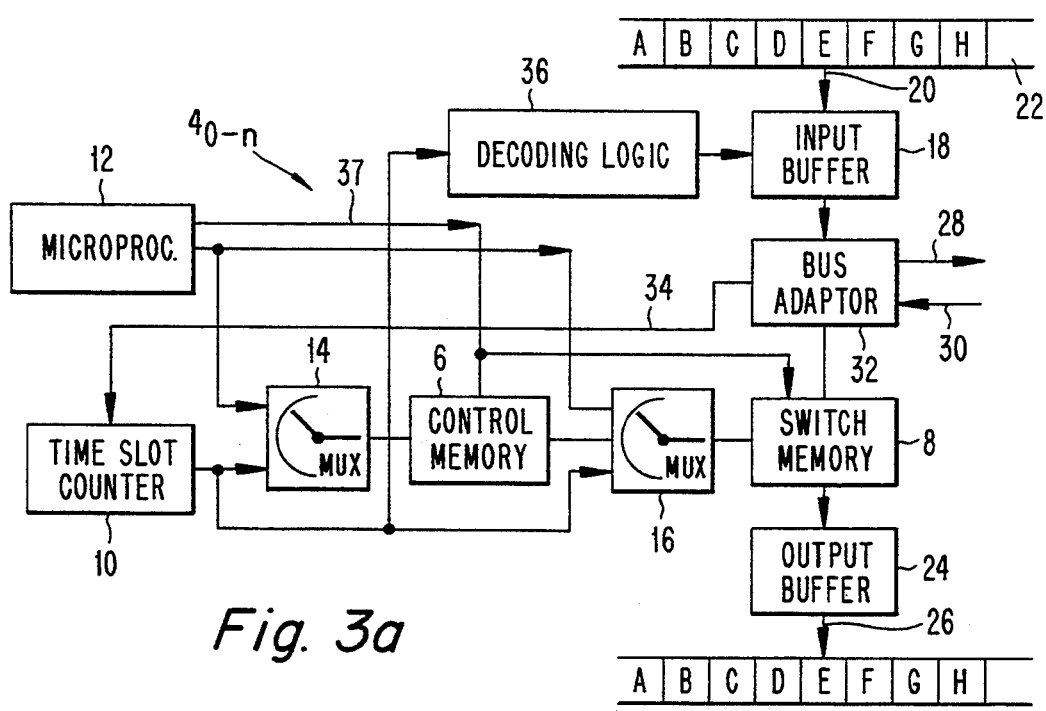
FIGS. 3$a$–$c$ are blockdiagrams showing embodiments of a distributed time switch according to the invention, FIG. 4 schematically illustrates the design of switch memory and control memory by means of memory cells in time switches according to FIGS. 3$a$–$c$, FIG. 5 likewise schematically illustrates the implementation of one of a plurality of memory cells included in the switch memory and the control memory according to FIG. 4.
Figure 3B:
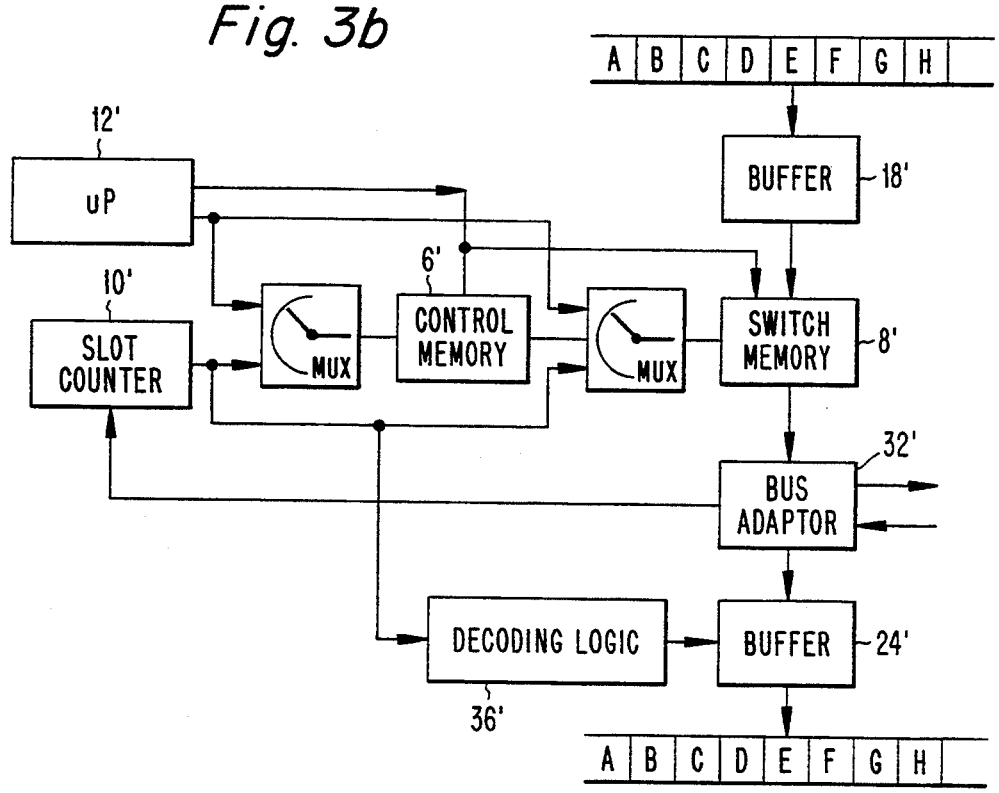

In FIG. 3b elements having the same denomination as in FIG. 3a have the same reference numbers as in the latter with the addition of a prime sign. The embodiment according to FIG. 3b differs from the one in FIG. 3a by the switch memory 8' being positioned for receiving the incoming trunk stream instead of the outgoing one, which implies that the incoming trunk stream can be sent out on a common buss via the buss adaptor 32' in an arbitrary order and an arbitrary time slot. The decoder function 36' is arranged to control clocking in of data into the output buffer 24', which is done in specific time slots on the common data buss.

Figure 3C:
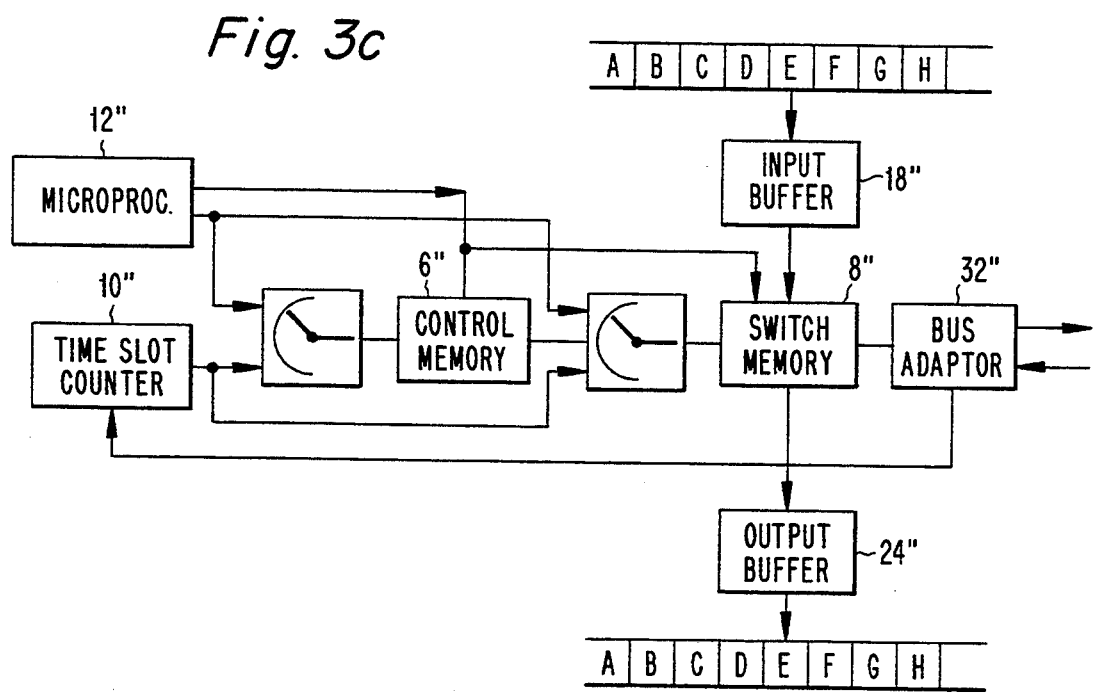

In FIG. 3c elements with the same denominations as in FIG. 3a have the same reference numbers as in the latter with the addition of a double prime sign. In the embodiment according to FIG. 3c both incoming and outgoing trunkstream can pass through the switch memory 8. The disadvantage is that twice as many memory positions, i.e. one in each direction, are needed as compared to the two earlier embodiments, but the need for decoding logic disappears.

Figure 4:
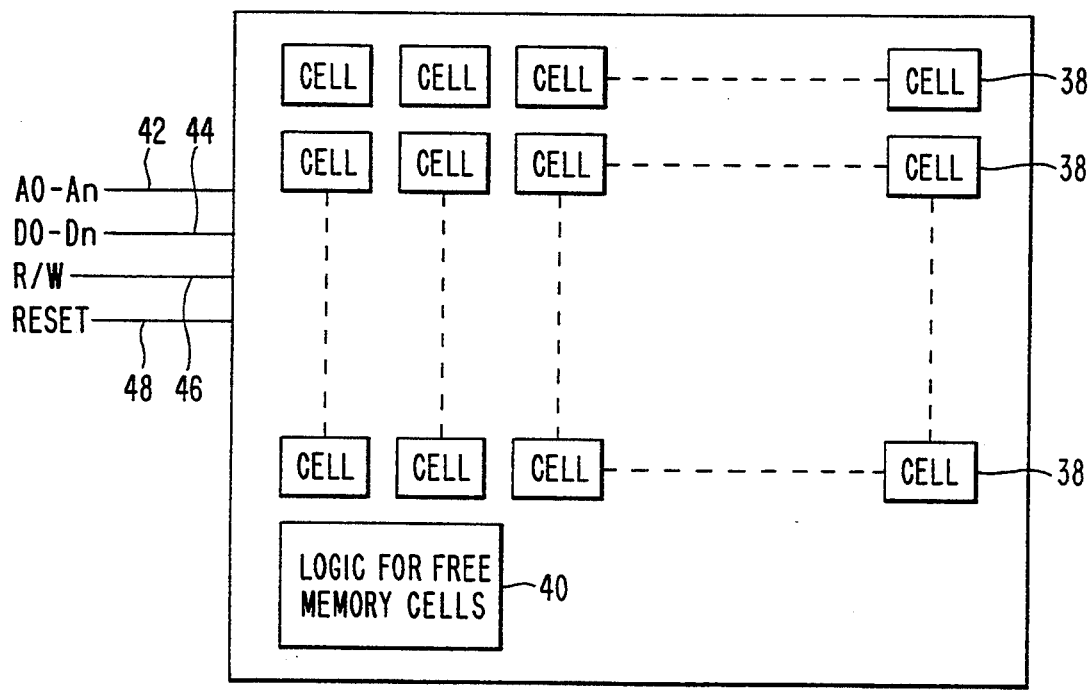

FIG. 4 illustrates the switch memory 8 and control memory 6 in the form of a block diagram. Each memory 6,8 includes memory cells 38, the number of which is smaller than the number of positions. A logic 40 is included for managing free cells, as is explained more in detail below. At 42, 44, 46 and 48 address, data, write/read and reset lines, respectively, are indicated, the functions of which will be appear from the following description with reference to FIG. 5.

Figure 5:
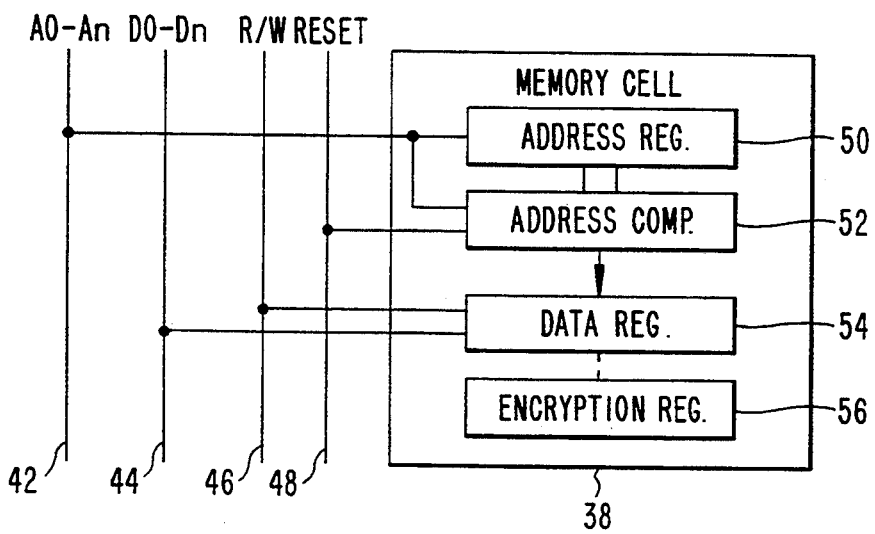

FIG. 5 shows an example of the design of the memory cells 38. Each memory cell includes an address register 50, an address comparator 52, a data register 54, and optionally an encryption register 56. The address register 50 defines the address of the memory cell. By means of the address comparator 52 the address on the common address buss is compared to the contents in the address register 50 and when the address fits the contents of the data register can be read or written. To enable movement of a memory cell in address space a reset function is available via the line 48. If the memory cell is pointed out and a reset signal present on the line 48 is activated, the memory cell is deactivated. If writing is done on an address, which does not correspond to any memory cell, a free cell with the corresponding address is initiated by means of the logic 40 and data is entered into the data register. A "pool" of free cells can e.g. be realized as a fifo queue.

In the presently going on standardisation process related to DQDB and FDDI-II it has been suggested that only 8 bits data should be transited. No redundancy is present for protection against erroneous connection. A simple way to solve this problem is to encrypt data and include the key in the switch instruction. The key is unique for each specific connection.

The realisation of encryption in the suggested switch structure in FIG. 3c can e.g. be performed by supplementing the memory cell in the switch memory 8 in FIG. 5 with the encryption register 56. In this case a memory cell is needed both for reading from and for writing to a common buss, i.e. the architecture follows FIG. 3c. At set up of a connection between two nodes via the common buss the same key is written into the encryption register 56 in both nodes. The encryption register can be a feedback shift register having a random generator function. The random data changes the data so that the PCM signals on the common buss will be impossible to understand without deciphering.

Figure 6:
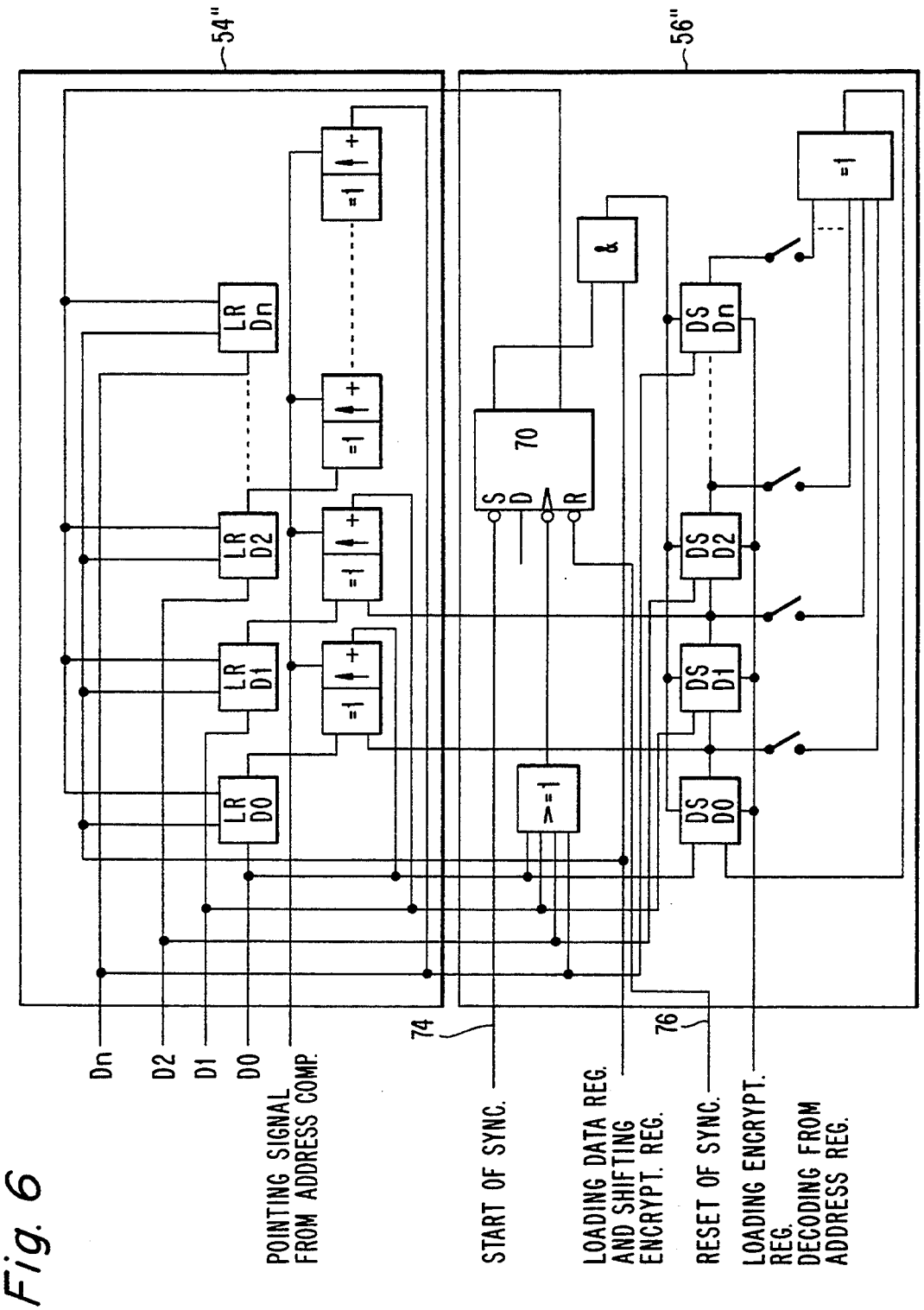
FIG. 6 shows an embodiment of an encryption register included in the switch memory.

FIG. 6 shows an encryption implementation encrypting and decrypting with the same algorithm. As the Figure is selfexplaining to the man of the art by including components and connections shown in an accepted way, no further description of the design of the shown circuit is required here except to note that the four switches shown in the encryption register 56" may be arbitrarily positioned. In the realisation the encryption register 56" includes the same number of bits as the data register 54" but different numbers are also possible. $D_0$–$D_n$ is data arriving into the memory. The following sequence of events can e.g. be performed at a set up of a connection between transmitting node, below called A-node, and receiving node, below called B-node:

- The microprocessor 12" in the A-node (uP) writes the readout address to the switch memory 8" into the control memory 6". At writing a free memory cell 38 is collected from the pool of free cells in the control memory 6" and initiation is made of the memory cell address register 50 with the memory cell address as well as of the memory cell data register 54 with read address.
- The A-node microprocessor creates encryption synchronisation by writing zeros into encryption register 56 of the switch memory 8". At writing, a free memory cell is collected from the pool of free cells in the switch memory and initiation of the memory cell address register 50 is made with the address of the memory cell and the encryption register is initiated by zeros. The signal "Start of Sync" on line 74 is activated resulting in the data register 54 being reset and no shifting of the encryption register 56 being made. The outgoing data consists only of zeros, in this case constituting the synchronisation word.
- The A-node transmits an encryption key in a switching instruction to the B-node. The B-node stores it for later use.
- The B-node microprocessor 12" writes readout address to the node switch memory 8" into its control memory 6". At writing a free memory cell 38 is collected from the pool of free cells in the control memory 6", the cell address register 50 is initiated with the memory cell address and the memory cell data register with the read address.
- The B-node microprocessor writes the encryption key into its switch memory 8". At writing a free memory cell is collected from the pool of free cells in the switch memory and initiation is made of the memory cell address register 50 with the address of the cell and of the encryption register with the key. The signal "Start of Sync" on the line 74 is activated implying that the receiving memory cell is waiting for encryption synchronisation. No shift of the encryption register is performed.
- The A-node writes the key into the encryption register of the cell in question. After writing into the register its flip-flop 70 is also reset by activation of "Reset Sync" on line 76. Shift of the encryption register is started.
- The B-node detects the synchronisation word and decrypts data. As long as the encryption word is transmitted no shifts of the encryption register are performed. When the synchronisation word is removed from the buss the flip-flop 70 is automatically reset due to the fact that the data do not include only zeros and decryption is started.

What is claimed is:

1. A digital switch intended for use in a node in a circuit switched telecommunication network with a distributed switching function, the switch comprising:
   a switch memory,
   a time slot counter, which is connected to the switch memory and arranged to point out an address therein for cyclical writing in the switch memory of data arriving into the switch,
   a control memory for controlling an order of data read out from the switch memory, and
   an adapting device,
   wherein the switch memory is connected via the adapting device to a transmission medium, which is common to a number of nodes in the network, the time slot counter is connected via the adapting device for receiving frame synchronization from the common transmission medium, the control memory is arranged for selecting time slots from the common transmission medium and for generating a read address to the switch memory, and each of the control memory and the switch memory includes a number of memory cells and an address space that defines a number of addressable cells, the number of the memory cells being less than the number of addressable cells.

2. A switch according to claim 1, wherein the switch memory is disposed between the adapting device and a data output to the node, and a decoding logic is disposed between the time slot counter and an input buffer for incoming data to the node to direct the data via the input buffer and the adapting device on specific time slots in the common transmission medium.

3. A switch according to claim 1, wherein the switch memory is disposed between a data input from the node and the adapting device and the switch includes a decoding logic disposed between the time slot counter and an output buffer for controlling reading in of data from the common transmission medium into the output buffer for specific time slots on the common transmission medium.

4. A switch according to claim 1, wherein the switch memory receives incoming data from the node and forwards that data to the adapting device and receives incoming data from the adapting device and forwards that data to the node.

5. A digital switch for a node in a circuit switched telecommunication network with a distributed switching function, the switch comprising:
   a switch memory including a plurality of memory cells,
   a time slot counter, which is connected to the switch memory and arranged to point out an address therein for cyclical writing in the switch memory at that address of data arriving into the switch,
   a control memory for controlling a sequence order of data read out from the switch memory, and
   an adapting device,
   wherein the switch memory is connectable via the adapting device to a transmission medium, which is common to a number of nodes in said network, the time slot counter is connected via the adapting device for receiving frame synchronization from the common transmission medium, the control memory selects time slots from the common transmission medium and generates a read address to the switch memory, and each memory cell of the switch memory includes an encryption register for storing an encryption key and means, in communication with the encryption register, for encrypting traffic between two nodes in the network.

6. A switch according to claim 5, wherein the encrypting means transmits a unique encryption key together with each request for connection from one node to another.

7. A switch according to claim 5, wherein each of the control memory and the switch memory includes a number of memory cells and an address space that defines a number of addressable cells, the number of memory cells being less than the number of addressable cells.

* * * * *